United States Patent [19]

Paget

[11] Patent Number: 4,470,998

[45] Date of Patent: Sep. 11, 1984

[54] METHOD OF EVAPORATING A LIQUID MASS, AND EVAPORATION APPARATUS

[75] Inventor: Anthony J. Paget, Haxby, England

[73] Assignee: Yorkshire Process Plant Limited, York, England

[21] Appl. No.: 346,316

[22] Filed: Feb. 5, 1982

[51] Int. Cl.³ .......................... A23G 3/00; A23G 3/04
[52] U.S. Cl. ..................... 426/492; 426/660; 159/25 A; 99/348; 202/175; 366/148; 366/290; 366/295
[58] Field of Search ............ 426/492, 660; 159/25 A; 99/348; 202/175; 366/148, 290, 295

[56] References Cited

U.S. PATENT DOCUMENTS

| | | | |
|---|---|---|---|
| 1,087,409 | 2/1914 | Tiemann | 159/25 A |
| 1,316,947 | 9/1919 | Wirth-Frey | 159/25 A |
| 1,975,560 | 10/1934 | Sollich | 159/25 A |
| 2,926,002 | 2/1960 | Spielvogel | 159/25 A |
| 3,356,045 | 12/1967 | Karpenko et al. | 426/660 |
| 3,739,710 | 6/1973 | Costa | 99/348 |
| 4,056,640 | 11/1977 | Otto | 426/660 |

*Primary Examiner*—Jeanette M. Hunter
*Attorney, Agent, or Firm*—John C. Smith, Jr.

[57] ABSTRACT

Evaporating and cooking of toffee in a closed vessel having an inlet at the base thereof and an outlet towards the top and at one side of the vessel. A toffee premix liquor is continuously fed in the inlet and discharged through the outlet. High speed counter rotating stirrers are provided in the vessel to agitate the liquor in a vigorous and turbulent manner, such as to form the liquor into a vortex, the extremities of which are urged towards the outlet. The vigorous and turbulent agitation of the liquor assists the production of high quality toffee as a continuous process, at a relatively high throughput rate.

17 Claims, 3 Drawing Figures

METHOD OF EVAPORATING A LIQUID MASS, AND EVAPORATION APPARATUS

This invention relates to methods of continuously cooking confectionery. It is particularly although not exclusively concerned with the preparation of toffee and like confectionery.

The preparation of high quality toffee presents special problems which are not generally encountered in the preparation of other confectionery. One reasons for this is the presence in toffee of sticky milk protein, which is very susceptivle to burning. Also, the ingredients of a toffee mix have to be continuously evaporated during the cooking process, in order to obtain particularly fine flavours and consistency. Furthermore, the differing ingredients such as fat and sugar have to be thoroughly mixed.

It is probably still true that one of the most reliable ways of making high quality toffee is to boil the toffee ingredients in batches, in open containers (usually of copper). However, although excellent results may be obtained, such traditional methods do not lend themselves readily to mass production of toffee. The filling and emptying of the open vessels for subsequent batches is rather time consuming. A continuous process of toffee would be much more cost effective.

Various apparatuses and methods are known for the production of confectionery by continuous processes. These generally involve the continuous feeding of the confectionery ingredients (known as a premix) through a cooking vessel, where the ingredients are heated. However, most known apparatuses and methods are unsuitable for the production of toffee, because they do not provide sufficient agitation of the ingredients in the cooking vessel (such that the sticky milk protein tends to stick to the heat transfer surfaces thereof, and burn). Moreover, heating is often carried out in such a manner as to prevent effective evaporation of the ingredients until they are about to be discharged, when a "flash" evaporation may take place. Such flash evaporation is quite unsuitable for toffee. Although some known apparatus may be used to produce toffee, the toffee generally is not of a very high quality, the apparatus being rather unsuitable to provide the necessary cooking action and fine control of the necessary parameters.

In U.S. Pat. No. 3,739,711 (Nieblach), there is disclosed an apparatus for the continuous production of toffee. A toffee premix is fed into the bottom of a closed vessel, in which the premix is heated and stirred. The premix rises up the closed vessel until it overflows into a discharge pipe in the centre of the vessel. The partly cooked toffee then flows down the discharge pipe into an "after caramelisation pot" below the main closed vessel. The toffee premix is fed in, and the toffee is discharged, in a continuous process.

The above-described apparatus has had a limited degree of success for the continuous production of toffee. However, we have found that this apparatus is not capable of providing high quality toffee, similar to the quality of toffees produced in the traditional batch processing manner. This is because the apparatus cannot provide a sufficiently vigorous and turbulent agitation of the premix in the closed vessel. As a result, the evaporation of the premix ingredients is limited, as is the degree of mixing, and the degree of heat transfer from the heat transfer surface of the closed vessel. The known apparatus is inherently unsuitable for vigorous and turbulent agitation of the premix, because of the positioning of the discharge pipe in the centre of the closed vessel. If the agitation means (comprising a rotary stirrer) were operated at high speed, the premix would be driven away from the discharge pipe, rather than towards it.

Preferred embodiments of the present invention aim to provide methods of evaporating a toffee premix, and apparatus therefor, which may produce toffee in a continuous process, both at a higher rate and of a higher quality than has been possible before.

It is to be understood, however, that the invention may have wider applications, other than just in the production of toffee.

The preferred embodiments of the invention are based upon the principle which we have discovered, that the success of toffee production, on a continuous basis, depends very much upon the mixing of the premix being vigorous and turbulent. In this way, the various phases present in a premix during cooking may be thoroughly mixed, and the necessary evaporation can be as full as possible, to give toffee of the finest consistency and flavour. Also, heat transfer between the premix and heat transfer surfaces of a cooking vessel may be improved, so that the toffee can be cooked at a higher rate.

More generally, according to the first aspect of the present invention, there is provided a method of evaporating a liquid mass comprising the steps of continuously introducing the liquid mass through an inlet into a vessel, supplying heat to a heat transfer surface of the vessel, agitating the mass in the vessel, and continuously discharging the evaporated liquid mass from the vessel at an outlet higher than the inlet, characterised in that the mass is agitated in the vessel in such manner as to cause turbulent mixing thereof and form the mass into a vortex, the extremeties of which are urged towards the outlet of the vessel.

In such a method, use is made of the vortex, to drive the liquid mass towards the outlet. Thus, the agitation can be as vigorous and turbulent as required, without driving the liquid mass away from the outlet.

According to a second aspect of the present invention, there is provided an evaporation apparatus for the continuous evaporation of a liquid mass comprising a closed vessel, an inlet to the vessel, an outlet of the vessel, higher than the inlet, heat supply means for supplying heat to a heat transfer surface of the vessel, and agitation means for agitating a liquid mass in the vessel, characterised in that the outlet is at or towards one side of the vessel, and the agitation means is arranged to cause turbulent mixing of a liquid mass in the vessel and form the mass into a vortex, the extremities of which are urged towards the outlet.

Further optional features of the invention and advantages of preferred embodiments thereof will be apparent from the following description, which is given by way of example only, with reference to the accompanying diagrammatic drawings, in which.

Figure 1:
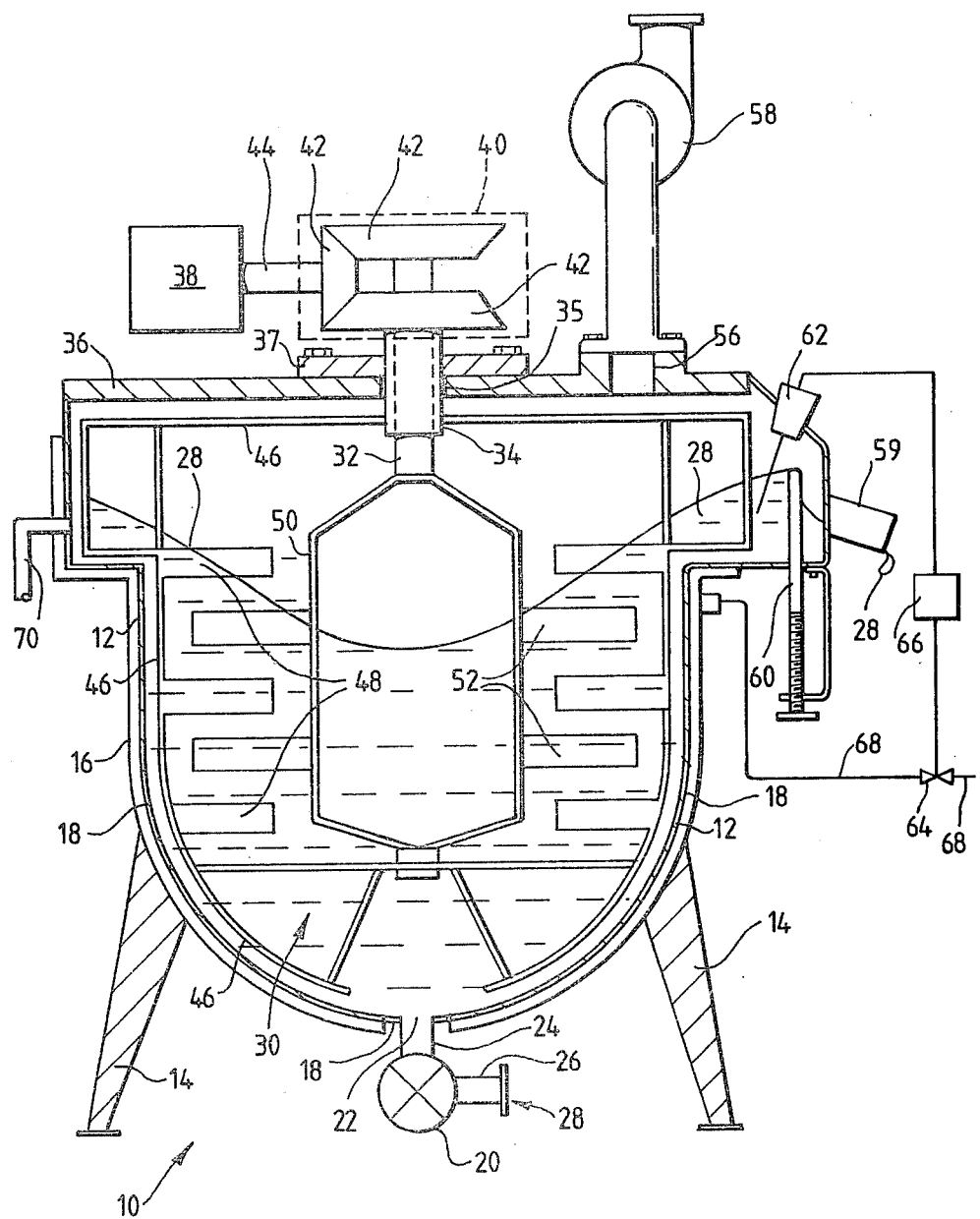
FIG. 1 is a diagrammatic side elevation of an evaporation apparatus embodying the invention, shown partly in section.

In FIG. 1, the evaporation apparatus is indicated generally at 10 and comprises a substantially hemispherical closed stainless steel vessel 12 which is supported above the ground level on legs 14 with the dome of the vessel 12 lying adjacent to the ground.

A heating jacket 16 is secured around the outer periphery of the vessel 12 and steam (not shown) is arranged to pass through the jacket 16 to heat the side and lower walls 18 of the vessel 12 connected thereto.

A reversible metering pump 20 is coupled to an opening 22 formed through the base of the vessel 12 by means of a connecting pipe 24. The pump 20 is also connected by means of a conduit 26 to a supply of ingredients (not shown) for use in the manufacture of toffee. The ingredients (not shown) are added together and mixed in a holding tank (not shown) to give a premixed liquor 28 which is arranged to be continuously fed from the holding tank (not shown) through the conduit 26 on operation of the metering pump 20 in one sense, liquid 28 then passing through the metering pump 20, the connecting pipe 24 and the opening 22 into the base of the vessel 12 at a rate determined by the operating speed of the metering pump. The operating speed of the metering pump 20 can be adjusted to regulate the rate at which the liquor 28 is fed to the vessel 12. The metering pump 20 can also be reversed and operated in the opposite sense to that already mentioned, the pump 20 then being arranged to draw liquor 28 from the base of the vessel 12 through the connecting pipe 24 in order to discharge the liquor 28 from the vessel 12.

A paddle stirrer 30 is mounted within the vessel 12 and the drive shaft 32 and a drive sleeve 34 of the stirrer 30 each extend downwardly from a gearbox 40 through a hole 35 formed in an upper wall 36 of the vessel 12 and are each arranged to be rotated by a variable speed motor 38 via the gear box 40. The shaft 32 and the sleeve 34 are journalled within the gearbox 40 to permit rotation of the shaft 32 and the sleeve 34 relatively to the gear box. A flange 37 of the gear box 40 is bolted to the upper wall 36 once the shaft 32 and the sleeve 34 have been inserted through the hole 35 so that the gear box 40 is rigidly secured to the vessel 12.

The gear box 40 incorporates three bevel gear wheels 42, a first of which is secured to a drive shaft 44 of the motor 38, a second of which is secured to the free end of the shaft 32, the third gear wheel being secured to the free end of the sleeve 34. The first gear wheel 42 is in driving engagement with both the second and the third gear wheels 42 but is arranged to drive the second gear wheel in one sense and the third gear wheel in the opposite sense so that when the motor is energised the shaft 32 and the sleeve 34 are driven by the gear box 40 in opposite rotational directions. The sleeve 34 is secured to a framework 46 arranged around the inner periphery of the vessel 12 and a first set of paddles 48 extends horizontally inwardly towards the centre of the vessel 12. The shaft 32 is secured to an inner framework 50 rotatably mounted within the vessel 12 substantially on the centre line thereof. A second set of paddles 52 extend horizontally outwardly from the inner framework towards the side walls of the vessel 12. Each paddle of the second set of paddles 52 is arranged to pass between an adjacent pair of paddles of the first set of paddles 48 when the shaft 32 and the sleeve 34 are driven on energisation of the motor 38, as previously described. It will be appreciated that the framework 46 and its first set of paddles 48 rotate in an opposite sense to the inner framework 50 and its second set of paddles 52 during energisation of the motor 38. The speed of counter rotation of the first and second set of paddles 48 and 52 can be varied by altering the speed of the motor 38. The two sets of paddles 48 and 52 are arranged to be driven at high speeds of up to 200 r.p.m. by the motor 38 and because the two sets of paddles are counter rotational one with respect to the other, they are arranged to provide vigorous and turbulent mixing of the liquor 28 supplied to the vessel 12.

An opening 56 is formed through the upper wall 36 at one side of the vessel 12 and an extractor fan 58 coupled to the opening 56 is arranged to draw moisture and volatile matter from the vessel 12 through the opening 56 to enhance the evaporation of a fluid heating in the vessel 12.

An outlet tube 59 extends outwardly and downwardly at an angle from the upper side wall of the vessel 12 adjacent to the opening 56. A weir 60 is provided within the vessel 12 adjacent to the outlet tube 59 and the height of the weir is adjustable relatively to the outlet tube 59. Variations in the height of the weir provide an adjustment of the retention time of the liquor 28 in the vessel 12. Thus, if the weir 60 is set at a relatively low height with respect to the outlet tube 59, the liquid 28 is easily able to flow over the weir 60 to the outlet tube and therefore has a correspondingly shorter retention time in the vessel 12 than a liquor which has to rise up over the weir 60 when the latter is set at a greater height with respect to the outlet tube. The rate at which the liquor 28 is fed through the vessel 12 will, of course, be dependent on the rate at which the liquor 28 is pumped into the vessel by the metering pump 20, but when the pump 20 is arranged to deliver liquor to the vessel 12 at a constant rate, the adjustment of the height of the weir 60 provides a fine adjustment of the retention time of the liquor in the vessel 12. A fine control of the retention time of the liquor 28 in the vessel 12 is of importance since the amount of heat supplied to the liquor, and the amount of moisture evaporated from the liquor are all dependent on the retention time of the liquor in the vessel and those two factors affect the final flavour, colouring, texture and other properties of the toffee produced from the liquor 28.

A temperature sensing probe 62 is secured through the side wall of the vessel adjacent to the outlet tube 59 and the probe 62 is arranged to monitor the temperature of the liquor 28 as it is discharged from the vessel through the outlet tube 59. The probe 62 is connected to a modulating flow valve 64 via a transducer 66, and the valve 64 is connected to the pipe work 68 supplying steam (not shown) to the heating jacket 16. The probe 62, the valve 64 and the transducer 66 form a control loop with the liquor 28 fed through the vessel 12, whereby the amount of steam supplied to the heating jacket 16, and hence the amount of heat supplied to the vessel 12 and liquor 28, can be automatically controlled in response to the temperature sensed by the probe 62. In operation the probe 62 monitors the temperature of the liquor 28 as it is discharged from the vessel 12 and sends a corresponding electrical signal to the transducer 66 which causes operation of the valve 64 in response to the signal received. Thus, if the temperature of the liquor 28 is sensed by the probe 62 to be too high the signal fed to the transducer 66 causes the transducer to initiate closure of the valve 64 to thereby restrict the amount of steam being supplied to the jacket 16 and hence reduces the heat supplied to the liquor 28 passing through the body of the vessel 12 to reduce the temperature of the liquor. Conversely, if the temperature sensed by the probe is too low, the electrical signal passed to the transducer 66 initiates opening of the valve 64 so that more steam is passed to the jacket 16 and more heat is supplied to the body of the liquor 28 in the vessel to raise the temperature of the liquor.

The signals fed to the transducer 66 will depend upon what optimum temperature is required for the liquor 28 as it is discharged from the vessel 12. Once the optimum temperature is chosen and the probe set accordingly, the probe will send no signal to the transducer once the liquor attains the optimum temperature as it is discharged from the vessel 12. Consequently, the valve 64 will not be operated and so a constant amount of heat will be able to pass through the valve to the heating jacket 16 so as to maintain the temperature of the liquor 28 discharged from the vessel at substantially the same value as the optimum temperature. However, any deviation in the temperature of the liquor sensed by the probe 62 from the optimum temperture will be controlled, as described above, by corresponding operation of the transducer 66 and the valve 64. In practice the temperature of the liquor at the outlet may vacillate initially but should soon settle down and approximate to the optimum temperature as the control exercised by the controller begins to take effect.

An inlet tube 70 is secured to the upper side wall of the vessel 12 on the opposite side thereof to the outlet tube 59. Ingredients, such as colouring or flavourings, can be added to the liquor 28 in the vessel 12 via the inlet tube 70 so that the ingredients can be mixed with the liquor prior to the discharge of the liquor from the vessel 12.

In use, liquor 28 is drawn off from the holding tank (not shown) by the metering pump 20 and fed at a constant rate through the connecting pipe 24 to the vessel 12. Steam (not shown) is supplied via the pipework 68 to the heating jacket 16, and the motor 38 is energised to drive the two sets of paddles 48 and 52 around in opposite directions within the vessel 12. As more and more liquor 28 is fed to the vessel the level of the liquor 28 rises up the sides of the vessel 12. The two sets of paddles 48 and 52 which are driven at between 50 and 200 r.p.m. by the motor 38, ensure turbulent mixing of the liquor 28 which as a result of the mixing action adopts a whirlpool or vortex configuration, in which its free surface is convexed downwardly as clearly shown by the profile shown in chain-dotted lines in FIG. 1. Hence, the level of the liquor in contact with the side walls of the vessel is raised by the mixing action. The paddles 48 and 52 not only push the liquor out towards the side of the vessel 12 but also tend to raise the liquor up as it passes through the vessel to aid the discharge of the liquor from the vessel over the weir 60. Because the paddles 48 and 52 urge the liquor 28 into contact with the side walls of the vessel 12 which are themselves in contact with the steam (not shown) in the heating jacket 16 a good heat transfer rate between the steam and the liquor 28 is ensured through the side walls of the vessel 12. Moreover, the turbulent mixing action of the paddles 48 and 52 ensures that the liquor is thoroughly mixed so that a uniform temperature distribution is maintained within the body of the liquor as it passed through the vessel 12. As the liquor is heated and mixed within the vessel 12, moisture is evaporated from the liquor and is drawn off through the opening 56 by the extractor fan 58.

The moisture content of the liquor, the amount of heat supplied to the liquor, the mixing of the liquor and the final temperature attained by the liquor after being processed by the apparatus 10 are all factors which can have a great effect on such things as the colour, flavour, texture, and odour of the toffee produced from the liquor 28. Thus, a great deal of control is needed on these factors to ensure a high standard of quality as demanded by the best toffee houses. The turbulent mixing provided by the paddles 48 and 52 not only ensures a uniform heating of the liquor 28 as it passes through the vessel 12 and therefore a uniform cooking rate of the liquor, but also gives full mixing and creaming of the liquor to assist its final flavour and texture, and also assists the rate of evaporation of moisture from the liquor which can affect the final consistency of the toffee produced from the liquor. The apparatus 10 is capable of producing toffee of a quality substantially equal to that produced in a traditional batch process, and we have constructed an apparatus such as 10 which will evaporate and cook one ton of toffee per hour in a continuous process. We have been able to achieve a heat transfer rate of 116 Btu/sq ft/°F./hr to the liquor, as compared with a rate of 50 Btu/sq ft/°F./hr in previously known apparatus, due to our improved mixing. However, another important advantage is that the apparatus 10 can be used for the batch manufacture of toffee, and in that case the metering pump 20 is operated to supply a measured charge of liquor 28 to the vessel 12. The opening 22 and the outlet of the vessel are then closed and the steam is then supplied to the heating jacket 16. The motor 38 is energised to cause counter rotation of the first and second sets of paddles 48 and 52 so as to stir the liquor 28 which is cooked and evaporated within the vessel for a predetermined length of time. When the liquor 28 has been fully processed the opening 22 at the base of the vessel 12 can be opened and the pump 20 operated in the reverse sense to draw off the liquor 28 from the vessel 12 and pump it to a suitable container (not shown) either via the conduit 26 or a similar duct coupled to the pump 20 (not shown). During the batch processing of the liquor 28 within the vessel 12, any ingredients which need to be added to the liquor such as, for example, flavouring and colouring matter can be added to the liquor in the vessel via the inlet tube 70. The control loop can also be exercised during the batch processing of the liquor 28 in order to control the heat supplied to the batch of liquor in the vessel and the temperature reached by that liquor. Also, a batch of liquor 28 could be supplied to the vessel through a hole (not shown) in the upper wall of the vessel 12, the hole normally being closed during continuous operation of the vessel 12.

Figure 2:
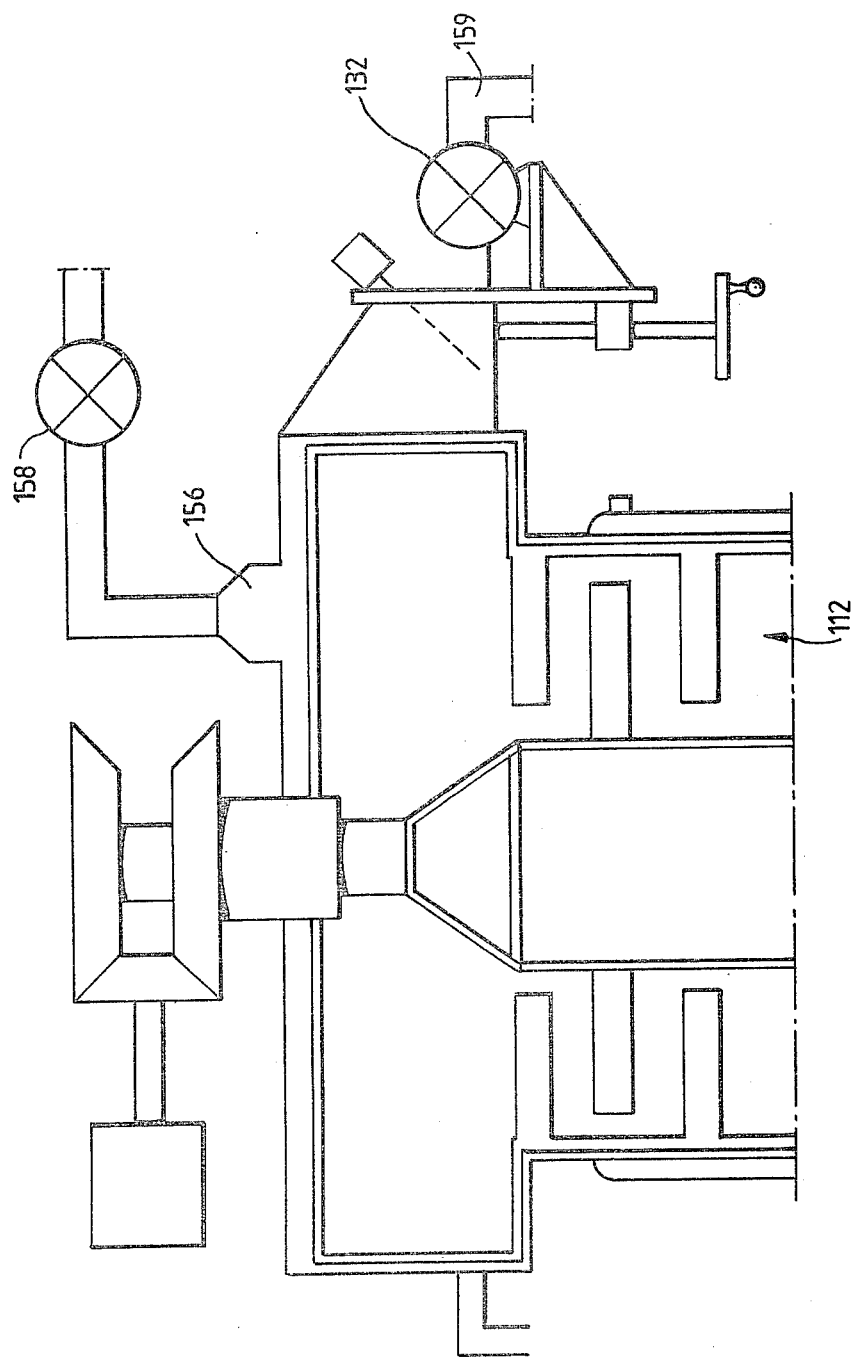
FIG. 2 is a part view of an apparatus which is similar to that of FIG. 1, but which has been modified.

The extractor fan 58 could be used in reverse if required to apply pressure to the liquor within the vessel 12 so that the heating of the liquor 28 is carried out under pressure, or a pump could be coupled to the extraction duct to increase or decrease the pressure in the vessel 12. Thus, for example, a vacuum pump could be connected to the extraction duct to reduce the pressure in the vessel 12 during the continuous processing of liquor 28 passed therethrough, and the liquor could be continuously removed from the vessel 12 via a pump, a valve or a trap. Similarly, a pump could be connected to the extraction duct for increasing the pressure within the vessel 12. FIG. 2 shows such a modified apparatus, in which there is provided a pump 158 connected to an outlet 156 to reduce the pressure within a vessel 112, and a pump 132 is provided to remove liquor from the vessel 112 via an outlet tube 159. In other respects, the apparatus of FIG. 2 is generally the same as the apparatus of FIG. 1.

Alternative embodiments of the invention are also envisaged. Thus, for example, the vessel 12 could be of a shape other than hemispherical, for example, the vessel 12 could be cylindrical or conical, and the vessel 12 could be formed of materials other than stainless steel such as, for example, copper or alloy steel. The paddle stirrer 30 could be replaced by other agitation means which is designed to produce turbulent mixing of the liquor 28 within the vessel 12 and form the liquor 28 into a vortex.

Figure 3:
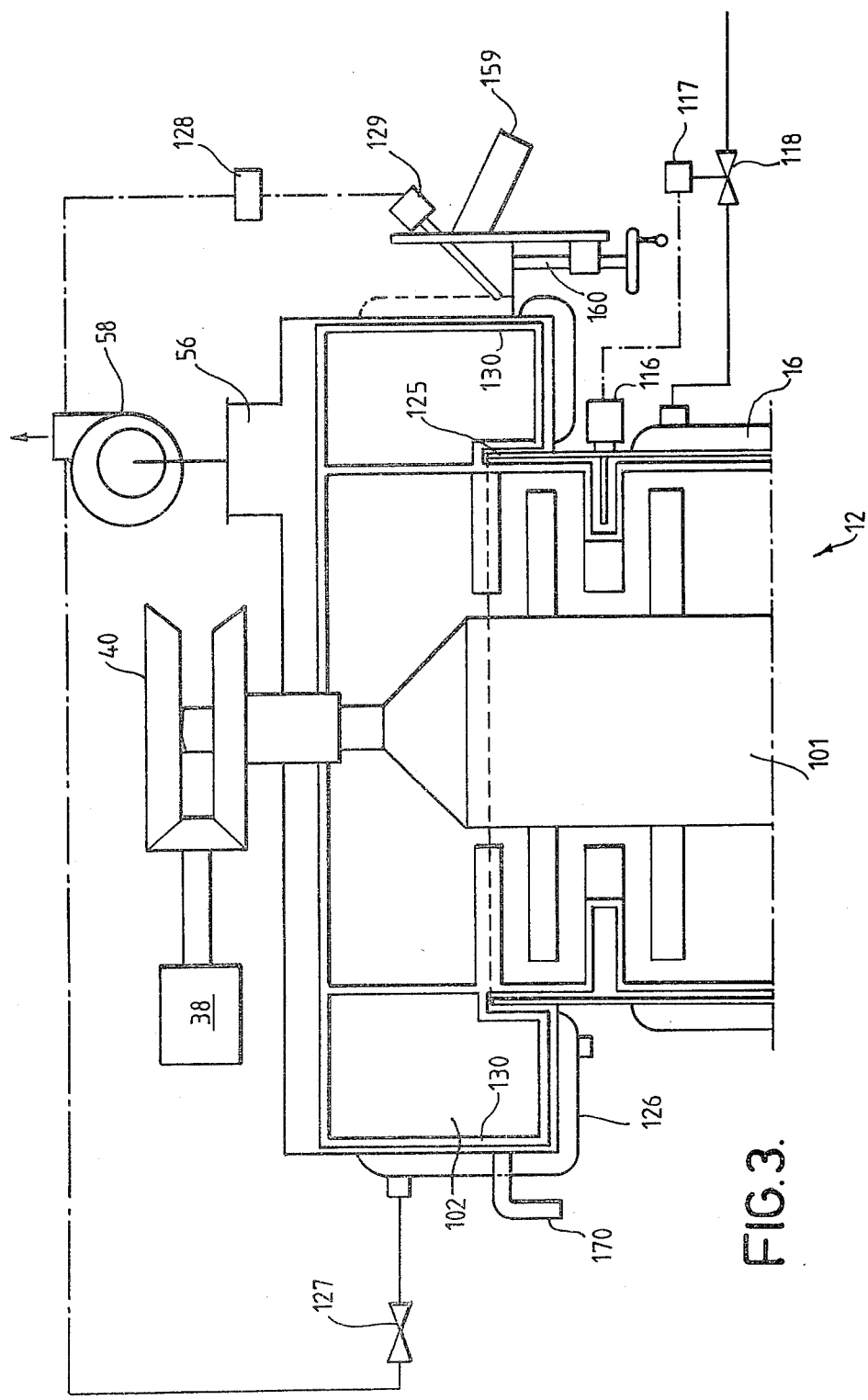
FIG. 3 is a part view of another evaporation apparatus which is similar to that of FIG. 1, but which has been modified.

Instead of the liquor 28 overflowing the weir 60 and being discharged from the vessel 12 through the outlet tube 59, the liquor may pass over the weir 60 into an outlet holding reservoir prior to being discharged through an outlet tube connected to the reservoir. If required the reservoir could be agitated by the paddle stirrer 30 or a similar agitation means and the reservoir could also be heated by a steam jacket similar to the jacket 16. Control of the steam supplied to the jacket around the reservoir could be exercised by a control loop similar to the one connected to the heating jacket 16. Thus, the heating jacket 16 and the second heating around the reservoir could be controlled independently of each other to finally control the heating of the liquor 28 both as it passes through the vessel 12 and as it overflows the weir 60 into the reservoir before being discharged from the apparatus 10. FIG. 3 shows one example of such apparatus.

The apparatus shown in FIG. 3 is generally similar to that shown in FIG. 1, except that the vessel 12 is separated into a first zone 101 and a second zone 102. The first zone 101 corresponds to the major part of the vessel 12 in FIG. 1, being heated by a respective heating jacket 16 as before. However, in FIG. 3, the first zone 101 is bounded by a weir 125, over which the extremities of the vortex formed by the agitation means flow, into the second zone 102. The second zone 102, formed concentrically around the first zone 101, has its own heating jacket 126, to which steam is supplied via a valve 127. The second zone 102 has its own agitation means 130 in the form of a simple stirring frame which is secured to the main agitation means of the first zone 101. An inlet 170 for colouring and flavouring ingredients leads to the second zone 102. An adjustable weir 160 and an outlet tube 159 are provided at the extremities of the second zone 102, in a similar manner to the apparatus of FIG. 1. A temperature sensing probe 129 is connected to control the valve 127, via transducer 128, in a manner similar to the heat supply control loop described above with reference to FIG. 1. Furthermore, the first zone 101 is provided with its own temperture sensing probe 116 adjacent to the weir 125, the probe being connected to a transducer 117 and 118 to control the flow of steam to the heating jacket 16, as described with reference to FIG. 1.

Thus, in the apparatus shown in FIG. 3, the temperatures in the first and second zones 101 and 102 may be controlled to some extent independently of one another, to provide a two stage cooking operation of the liquor 28.

It will be understood that although the apparatus 10 was described above in relation to the preparation of toffee from the liquor 28, the apparatus 10 could be used to prepare other confectionery items such as caramel or the like, and could also be used to evapoate and/or cook other liquid masses.

In the illustrated apparatus 10, the framework 46 of the stirrers passes over the heat transfer surface 18, with a small gap therebetween. In use, the speed of the framework 46 causes local turbulence at its leading edges, which has the effect of continuously clearing the cooking liquor from the heat transfer surface 18, thereby to prevent burning.

I claim:

1. A method of continuously cooking confectionery, comprising the steps of continuously introducing a liquid confectionery mass through an inlet into a closed vessel, agitating said liquid mass in said vessel in such manner as to cause turbulent mixing thereof and to form said mass into a vortex the extremities of which are urged towards an outlet of said vessel which is at a higher elevation than said inlet, supplying heat to a heat transfer surface of said vessel in contact with said liquid mass so as to evaporate moisture in said mass and cook said mass as said mass travels progressively up said vessel from said inlet to said outlet, withdrawing said evaporated moisture from said vessel, and continuously discharging the cooked liquid mass from said outlet.

2. A method according to claim 1, wherein the said heat is supplied by means of a steam jacket around the vessel.

3. A method according to claim 2, wherein said liquid confectionery mass is agitated by means of counter rotating stirrers.

4. A method according to claim 1, wherein the level of said outlet in said vessel is adjustable to vary the distance between said inlet and the upper level of said liquid confectionery mass and thereby adjust the dwell time of said mass in said vessel.

5. A method according to claim 1 including the step of adding further ingredients to said liquid confectionery mass in the vicinity of the upper level of said mass.

6. A method according to claim 5, wherein said further ingredients are selected from the group consisting of flavoring and coloring agents.

7. A method according to claim 1, including the step of monitoring the temperature of said liquid confectionery mass at said outlet and regulating said supply of heat to said heat transfer surface in dependence upon the monitored temperature to maintain said mass in said vessel at a substantially constant predetermined temperature.

8. A method according to claim 1, including the step of adjusting the pressure within the vessel to a desired level different from ambient pressure.

9. A method according to claim 8, including the step of removing the mass through said outlet by means of a pump.

10. A method according to claim 2 wherein said steam jacket extends substantially from said inlet to said outlet of said vessel.

11. A method according to claim 4 wherein said outlet comprises a weir over which said liquid mass flows and the height of which is adjustable.

12. A method according to claim 1, wherein said vessel is divided into first and second zones and said agitation of said liquid mass occurs in said first zone such that the extremities of said vortex are urged towards said outlet via said second zone.

13. A method according to claim 12, wherein said liquid mass is further agitated in said second zone by a respective agitation means in said second zone.

14. A method according to claim 12, wherein said liquid mass is heated in said second zone by a respective heat supply means of said second zone.

15. A method according to claim 14, including the step of monitoring the temperature of said liquid confectionery mass in the vicinity of said outlet and regulating said respective heat supply means of said second zone in dependence upon the monitored temperature to maintain said mass in said vessel at a substantially constant predetermined temperature.

16. A method according to claim 12, wherein said first and second zones are separated by a weir.

17. A method according to claim 12, including the step of adding further ingredients to said liquid confectionery mass in said second zone.

* * * * *